United States Patent
Liou (10) Patent No.: US 8,556,180 B2
(45) Date of Patent: Oct. 15, 2013

(54) MULTIWAVELENGTH BARCODE READER

(75) Inventor: Kenneth Liou, Taipei Hsien (TW)

(73) Assignee: Marson Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 12/578,173

(22) Filed: Oct. 13, 2009

(65) Prior Publication Data

US 2011/0084143 A1    Apr. 14, 2011

(51) Int. Cl.
*G06K 7/10* (2006.01)

(52) U.S. Cl.
USPC .................................................. 235/462.42

(58) Field of Classification Search
USPC .................................................. 235/462.42
See application file for complete search history.

(56) References Cited

U.S. PATENT DOCUMENTS

| 7,281,662 B2 * | 10/2007 | He et al. ............... 235/462.42 |
| 2005/0011956 A1 * | 1/2005 | Carlson ............... 235/462.42 |

FOREIGN PATENT DOCUMENTS

| JP | 06309486 A | * | 11/1994 |
| JP | 08202806 A | * | 8/1996 |

* cited by examiner

*Primary Examiner* — Christle Marshall
(74) *Attorney, Agent, or Firm* — Muncy, Geissler, Olds & Lowe, PLLC (57) ABSTRACT

A multiwavelength barcode reader is used for reading a barcode, and transmitting the read barcode to a system composed of a pair of connected information devices. In the barcode reader, several sets of light sources having different wavelengths are disposed so as to enable the barcode reader to provide a light source having a suitable wavelength in accordance with a color of the barcode when reading or scanning the barcode, thereby improving the resolution of the read or scanned barcode.

2 Claims, 7 Drawing Sheets

FIG.7

MULTIWAVELENGTH BARCODE READER

BACKGROUND OF THE INVENTION

1. Field of Invention

The present invention relates to a multiwavelength barcode reader for reading a barcode, and more particularly to a barcode reader provided with light sources having two or more wavelengths and capable of improving the resolution of a read barcode.

2. Related Art

Figure 1:
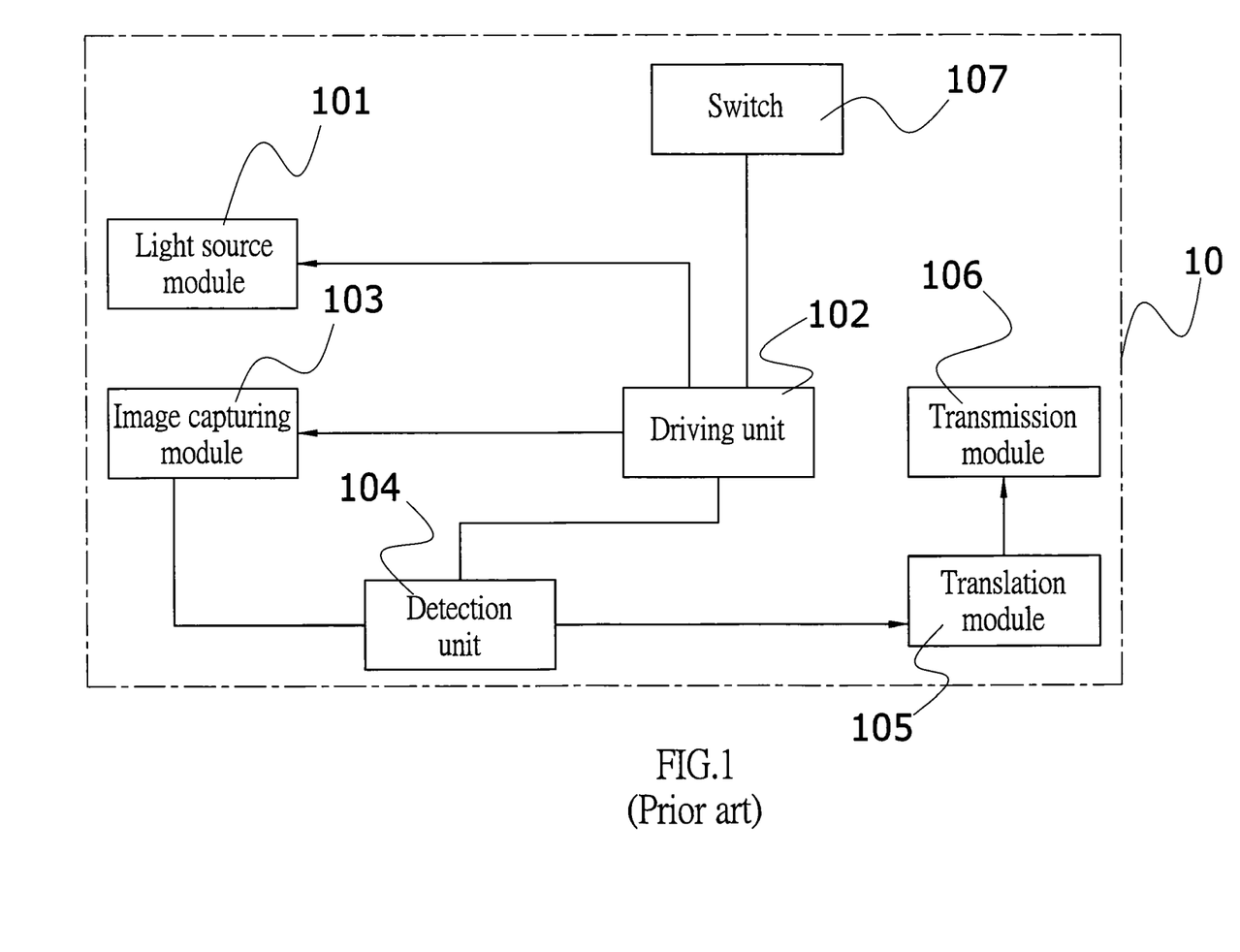
FIG. 1 is a schematic structural view of a conventional barcode reader.

FIG. 1 is a schematic structural view of a conventional barcode reader. Referring to FIG. 1, a barcode reader 10 (also known as barcode scanner) mainly includes a light source module 101, a driving unit 102, an image capturing module 103, a detection unit 104, a translation module 105, an transmission module 106, and a switch 107. The light source module 101 is formed by a plurality of light emitting diodes (LEDs), and electrically connected to the driving unit 102. The driving unit 102 is electrically connected to the switch 107, and after the switch 107 is turned on, the driving unit 102 is enabled to drive the light source module 101 to generate a light source. The image capturing module 103, that is, a charge coupled device (CCD), is used for capturing an image, and is electrically connected to the detection unit 104 and the driving unit 102. The detection unit 104 is used for detecting whether the image capturing module 103 successfully captures image data about the barcode, and is electrically connected to the driving unit 102. If the image capturing module 103 fails to capture the image data about the barcode, the detection unit 104 enables the driving unit 102 to drive the light source module 101 and the image capturing module 103 again to read the barcode (by means of scanning or image capturing). When the driving unit 102 drives the light source module 101 to operate, the image capturing module 103 is also driven to capture an image of the barcode. The translation module 105 is used for decoding and recognizing the image data about the barcode captured by the image capturing module 103, so as to convert the barcode symbol into information in the form of texts or figures. The transmission module 106 further connects the barcode reader 10 to an information device, such as a computer host, so as to transmit the decoded data to the information device connected thereto. The transmission module 106 has a transmission port as a connection end. The transmission port may be, for example, a USB (universal serial bus) transmission port, a PS/2 (Personal System/2) transmission port, or an RS232 (Electronic Industry Association-Recommended standard-232) transmission port.

Figure 2:
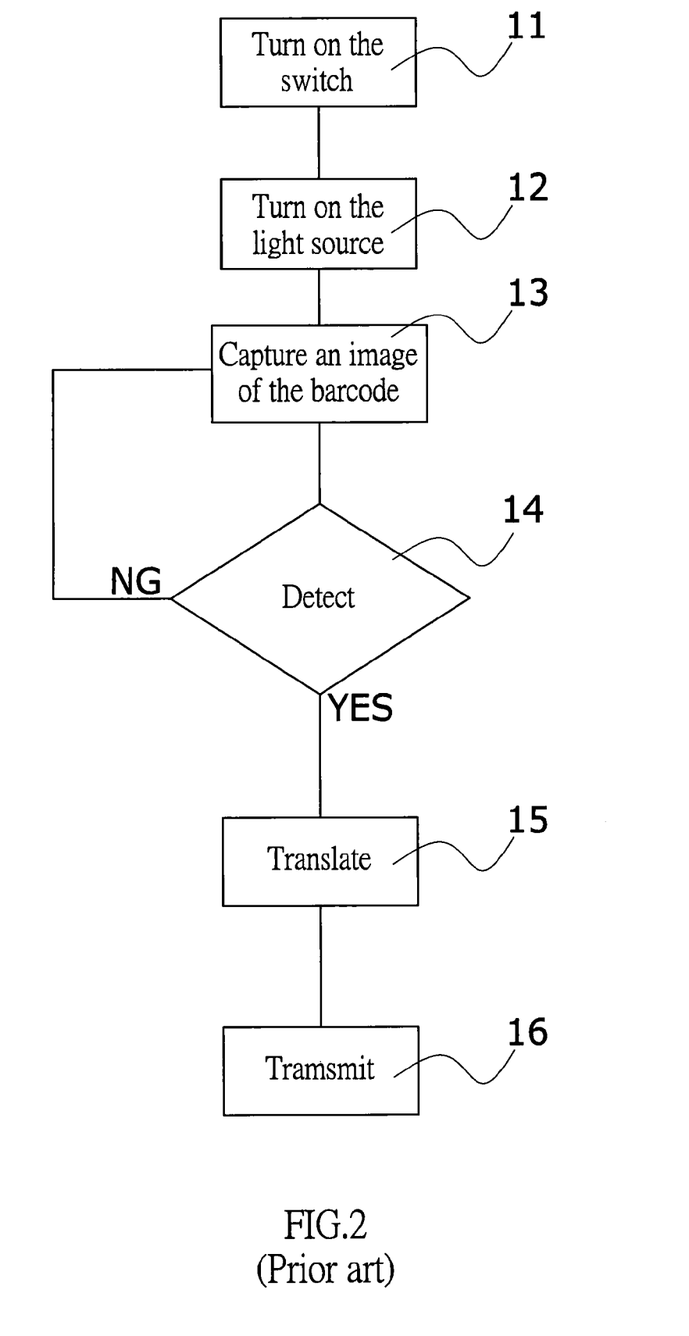
FIG. 2 is a flow chart of a process of implementing the conventional barcode reader.

FIG. 2 is a flow chart of a process of implementing the conventional barcode reader. Referring to FIGS. 1 and 2, the process includes the following steps.

Step 1, turn on the switch 11: a user presses down the switch 107 to start the barcode reader 10.

Step 2, turn on the light source 12: the driving unit 102 actuates the light source module 101 and the image capturing module 103, and the user aligns light generated by the light source module 101 with the barcode symbol to be captured.

Step 3, capture an image of the barcode 13: the image capturing module 103 captures an image of the barcode.

Step 4, detect 14: the detection unit 104 detects whether the image of the barcode is successfully captured, and if a detection result is "YES", a translating operation is performed; if a detection result is "NG", the image capturing module 103 continues to capture the barcode symbol.

Step 5, translate 15: the translation module 105 translates the captured image of the barcode, and converts the barcode symbol into information in the form of texts or figures.

Step 6, transmit 16: the transmission module 106 transmits the converted information to the information device.

In view of the above, in the implementation of the conventional barcode reader 10, when light generated by the light source module 101 is irradiated on a barcode symbol, the image capturing module 103 captures an image of the barcode symbol, and the image of the barcode symbol is translated into data in the form of texts or figures. In practice, most products available at the market have their barcode symbols printed on the external package, and the barcode symbols are generally composed of black bars on a white background. However, to meet the requirement of a nice and consistent package of the products, other colors, for example, red, green, and blue, are used as barcode colors for the barcode symbols when printed on the external package of the products. As the existing barcode reader all provide a single red light source, if the scanned barcode has a background color close to red or has a low color contrast after being irradiated by a red light, the reading of the barcode reader may be affected.

SUMMARY OF THE INVENTION

In order to solve the above problem, the present invention is directed to a barcode reader capable of scanning or reading barcodes in different colors.

Accordingly, the barcode reader of the present invention mainly includes light source modules having two or more different wavelengths, and the light source modules are capable of generating light sources of different wavelengths (colors), for example, red and green light. When the scanner scans a barcode, the light source modules may separately or simultaneously irradiate light on the barcode to generate light sources of different wavelengths (colors), so that the barcode symbol can be clearly seen based on the principle of color contrast. Therefore, the resolution and read rate of the barcode are improved.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 3:
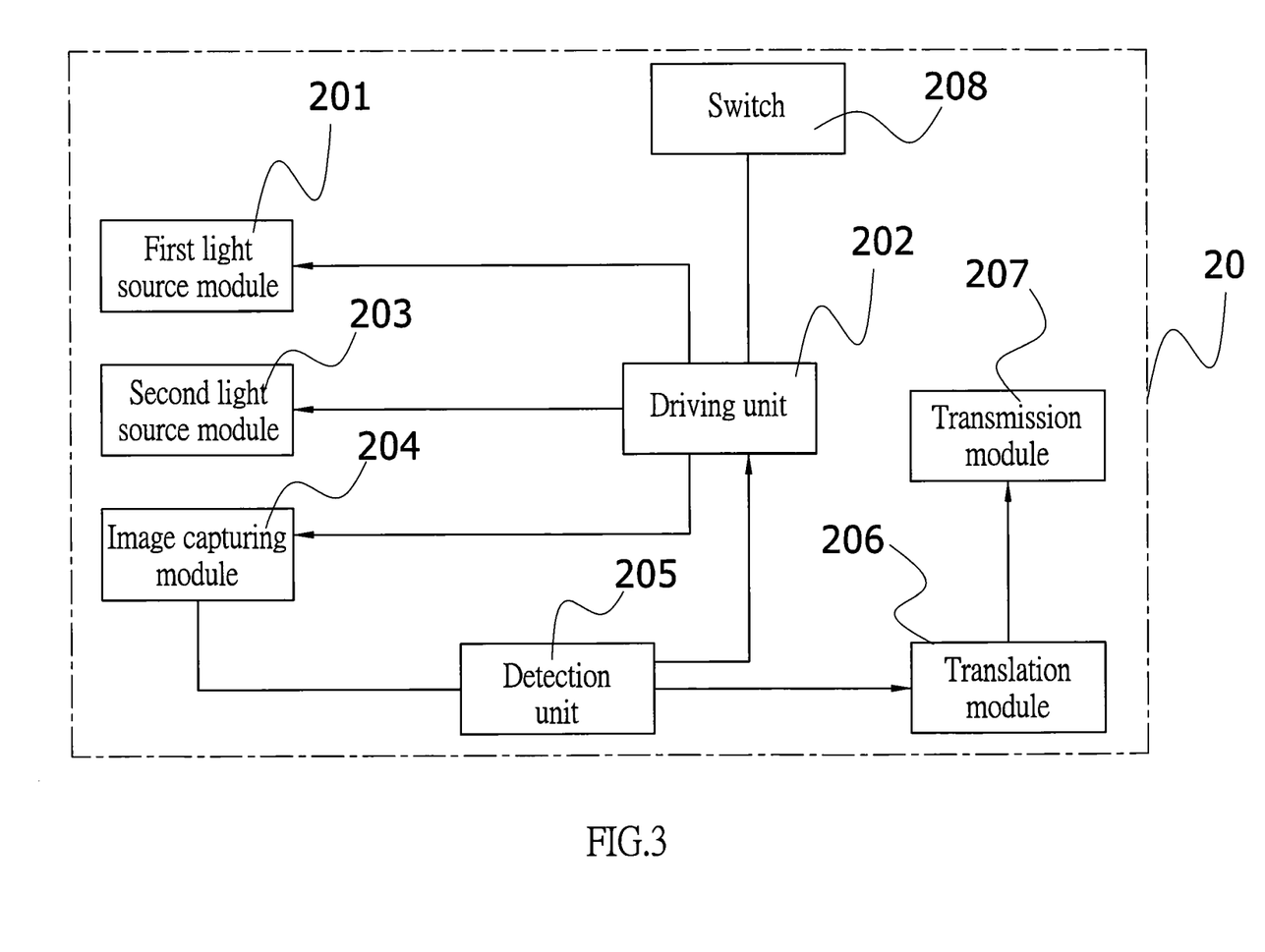
FIG. 3 is a schematic structural view of the present invention.

FIG. 3 is a schematic structural view of the present invention. Referring to FIG. 3, the multiwavelength barcode reader 20 of the present invention mainly includes a first light source module 201, a driving unit 202, a second light source module 203, an image capturing module 204, a detection unit 205, a translation module 206, a transmission module 207, and a switch 208. The driving unit 202 is electrically connected to the switch 208, so that the On/Off of the driving unit 202 is controlled by the switch 208. The driving unit 202 may be an on-chip microprocessor, and capable of managing a power source and actuating related electronic modules. The first light source module 201 and the second light source module 203 are respectively electrically connected to the driving unit 202. The driving unit 202 may sequentially or simultaneously drive the first light source module 201 and the second light source module 203 to emit light. The light source modules 201, 203 are formed by LEDs or laser diodes. One of the light wavelength of the light source module (201 or 203) generates red, blue, or green light. The image capturing module 204 is electrically connected to the driving unit 202, and driven by the driving unit 202 to capture an image of a barcode. The image capturing module 204 is a CCD (Charge Coupled Device). The detection unit 205, capable of detecting a signal, is electrically connected between the image capturing module 204, the driving unit 202, and the translation module 206, so as to detect whether the image capturing module 204 successfully captures the image of the barcode. On detecting a signal indicating that the image capturing module 204 fails to capture the image of the barcode, the detection unit 205 enables the driving unit 202 to drive the first light source module 201 or the second light source module 203 and the image capturing module 204 again. The translation module 206 is used for translating the image of the barcode captured by the image capturing module 204 into data in the form of texts or figures. The transmission module 207 is electrically connected to the translation module 206, and used for transmitting the data translated by the translation module 206 to another information device. The transmission module 207 is further connected to a physical connection port. The physical connection port may be, for example, a USB (universal serial bus) transmission port, a PS/2 (Personal System/2) transmission port, or an RS232 (Electronic Industry Association-Recommended standard-232) transmission port.

Figure 4:
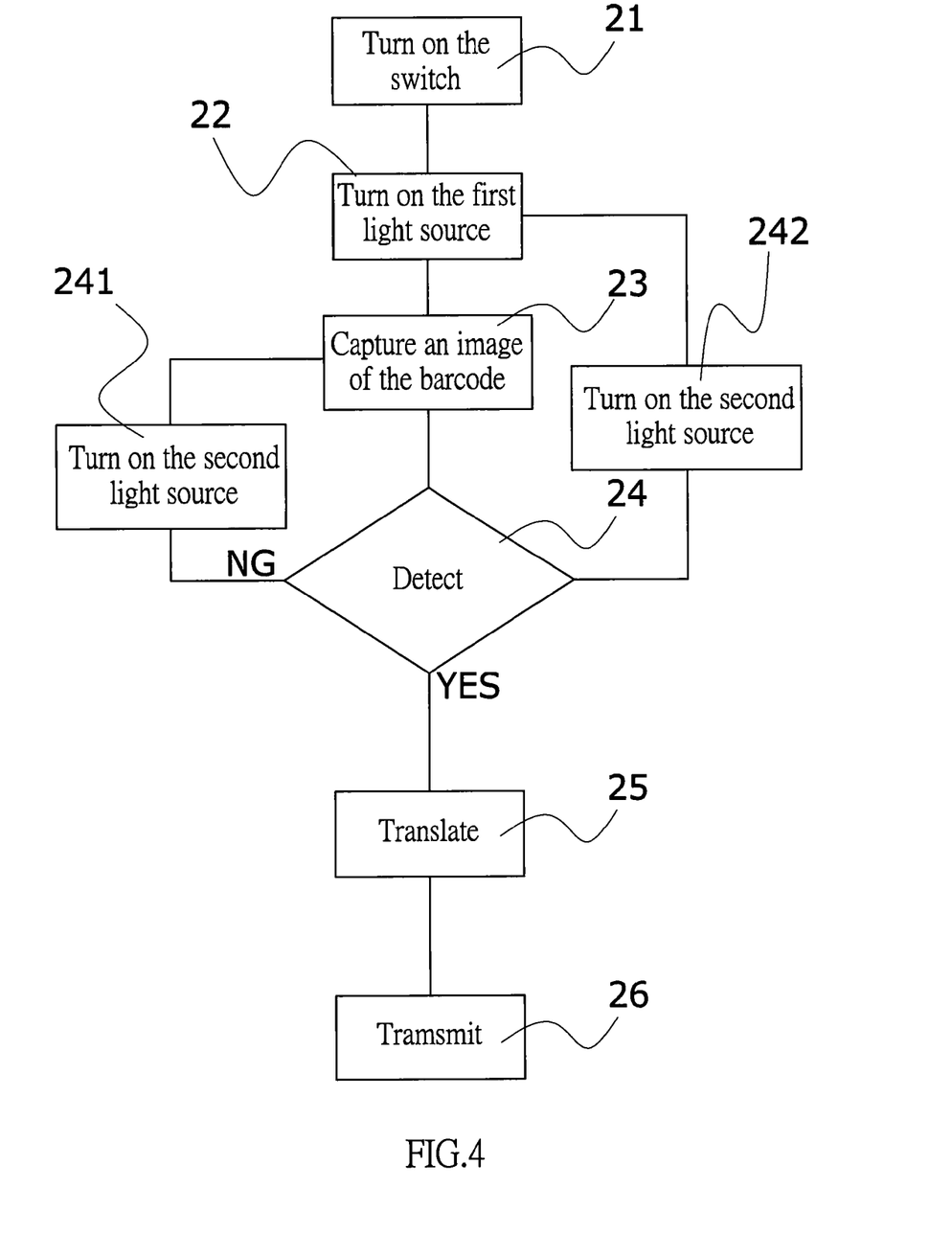
FIG. 4 is a flow chart of a process of implementing the present invention.

FIG. 4 is a flow chart of a process of implementing the present invention. Referring to FIGS. 3 and 4, the multiwavelength barcode reader 20 of the present invention is actuated by a user, and the specific implementation is illustrated as follows:

Step 1, turn on the switch 21: the user presses down the switch 208 to start the multiwavelength barcode reader 20.

Step 2, turn on the first light source 22: the driving unit 202 actuates the first light source module 201 to emit light, and the user enables the first light source module 201 to irradiate the emitted light on an image of the barcode to be read.

Step 3, capture an image of the barcode 23: the image capturing module 204 reads (or captures/scans) the image of the barcode.

Step 4, detect 24: the detection unit 205 detects whether the image capturing module 204 successfully reads the image of the barcode, and if yes, outputs a signal indicating "YES" to the translation module 206; otherwise, outputs a signal indicating "NG" to the driving unit 202.

Step 4-1, turn on the second light source 241: on receiving the "NG" signal for a first time in the previous step, the driving unit 202 drives the second light source module 203 to emit light. At this point, the light source generated by the first light source module 201 is turned off, and Steps 3 and 4 are performed. When detecting that the image capturing module 204 fails to read the image of the barcode for a second time, the detection unit 205 again outputs a signal indicating "NG" to the driving unit 202.

Step 4-2, turn on the second light source for a second time 242: on receiving the "NG" signal for a second time in the previous step, the driving unit 202 again drives the second light source module 203 to emit light, and Steps 2 to 4 are performed. At this point, the first light source module 201 and the second light source module 203 are both turned on to obtain a light blending effect. The image capturing module 204 again reads the image of the barcode, and if the reading is still unsuccessful, Steps 2 to 4-2 are repeatedly performed.

Step 5, translate 25: after the image capturing module 204 successfully reads the image of the barcode, the translation module 206 translates the read image of the barcode into data in the form of texts or figures.

Step 6, transmit 26: the transmission module 207 outputs the translated data in the form of texts or figures via a transmission port to a corresponding information device, for example, a computer host or a terminal of the barcode reader.

In view of the above, in the multiwavelength barcode reader of the present invention, light source modules having different wavelengths are disposed to provide light sources of different wavelengths when reading an image of a barcode, so as to meet the requirement of reading color barcodes. The light source modules may be sequentially, separately, or simultaneously turned on. When the light sources of different wavelengths are automatically turned on one after another, the barcodes of different colors can be read. When the light sources of different wavelengths are turned on at the same time, a light blending effect is obtained, which may improve the read rate of the image of the barcode, i.e., the resolution of the barcode, in spite of a color barcode. Moreover, each light source module is directly driven by the driving unit, and the user only needs to turn on the switch to actuate an automatic reading process. In the reading process, the light source modules are directly switched between the modes of being sequentially or simultaneously turned on by the driving unit, so as to improve the practical applicability and the resolution of the barcode reader.

Figure 5:
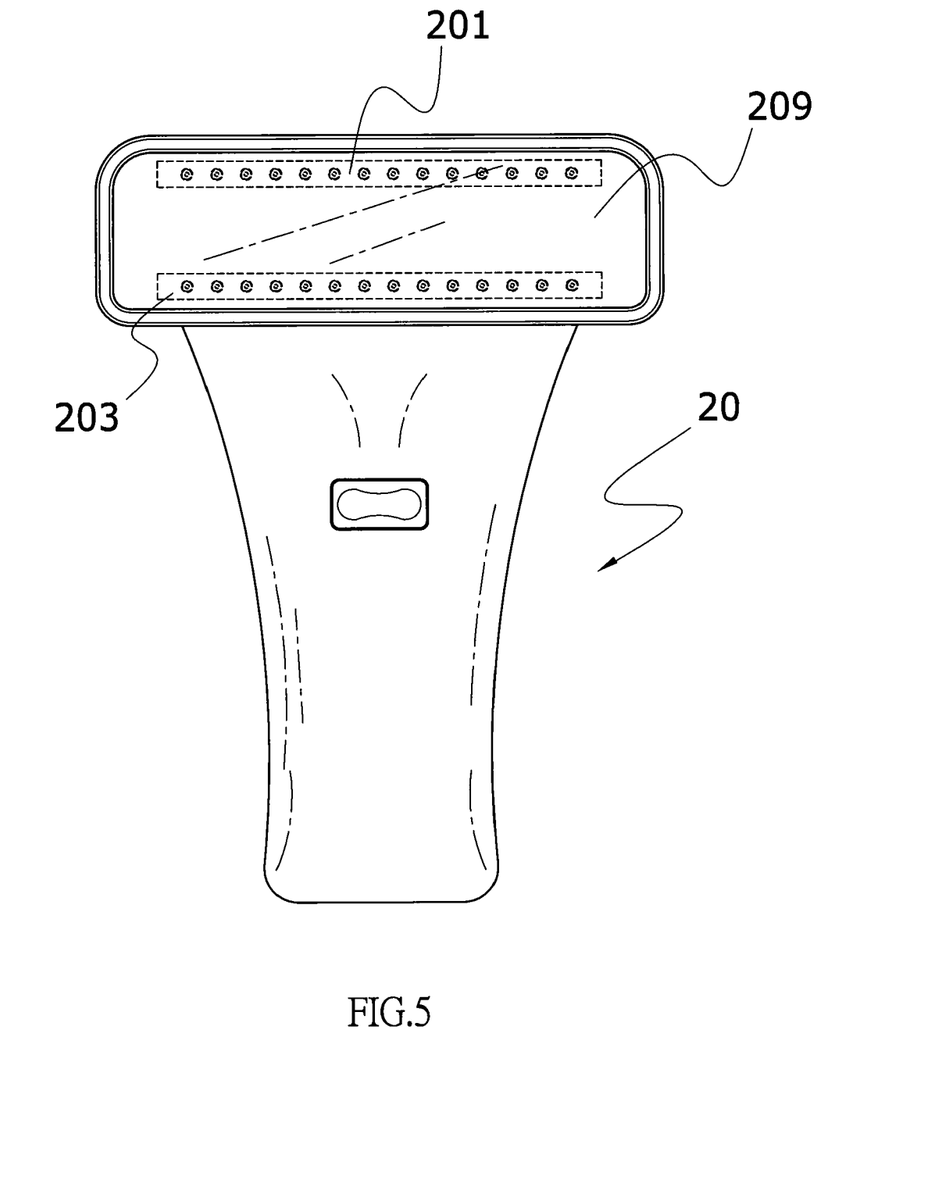
FIG. 5 shows a first preferred embodiment of the present invention.
Figure 6:
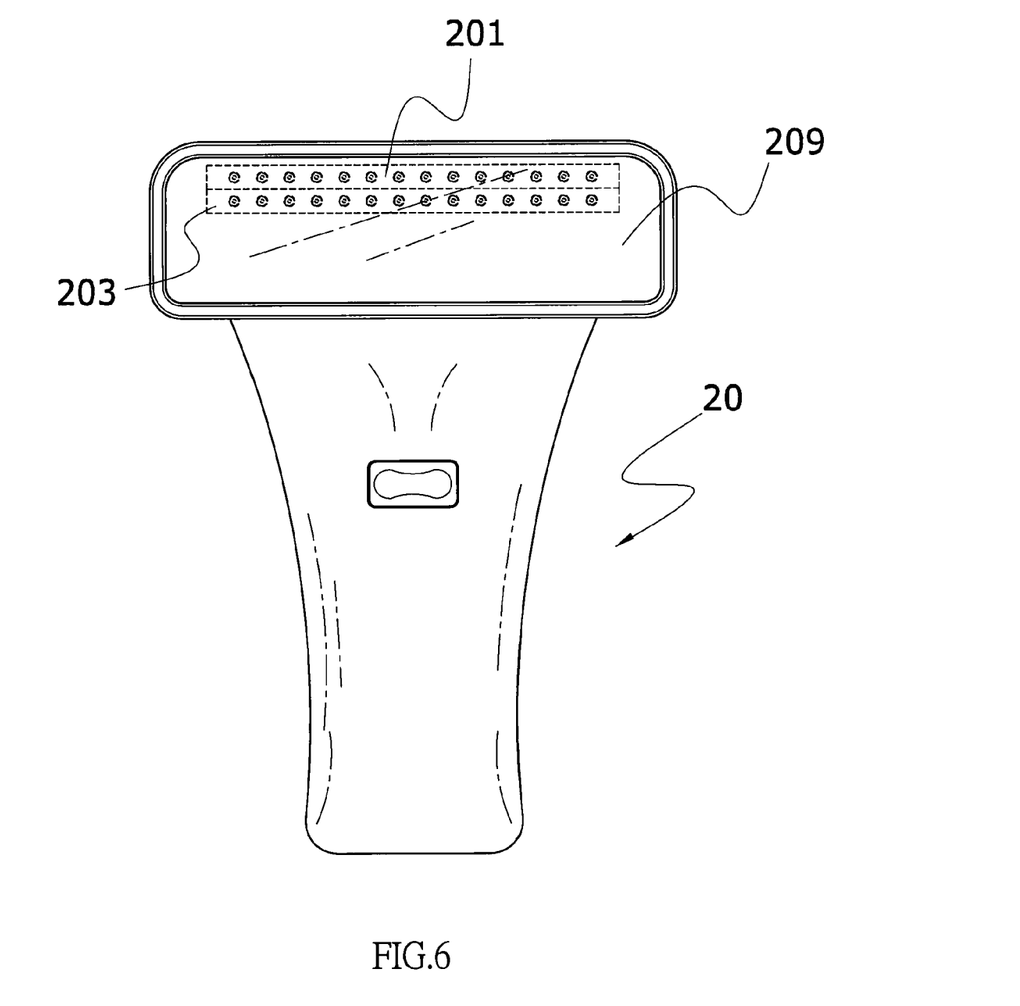
FIG. 6 shows a second preferred embodiment of the present invention.
Figure 7:
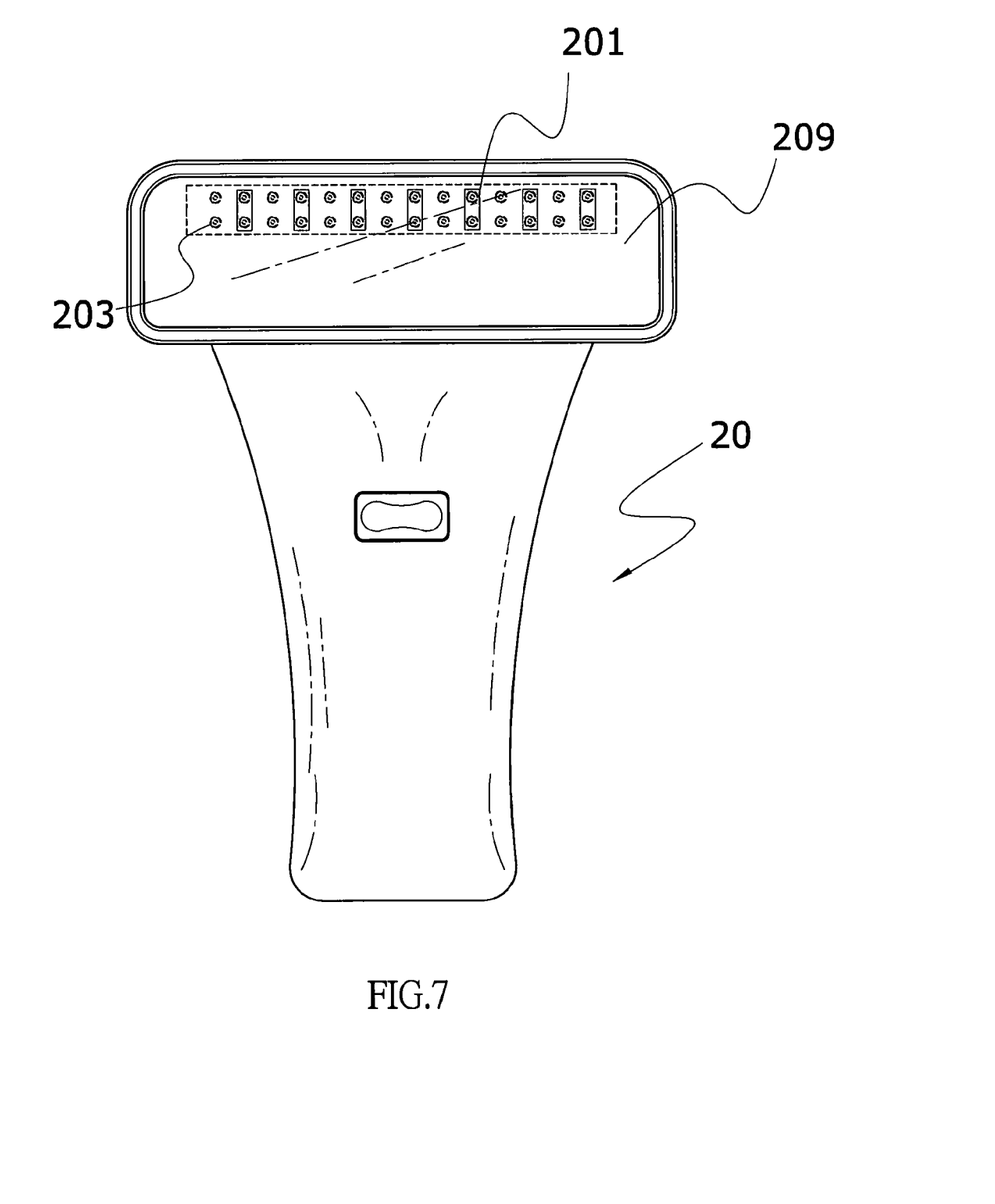
FIG. 7 shows a third preferred embodiment of the present invention.

FIG. 5 shows a first preferred embodiment of the present invention. Referring to FIGS. 3 and 5, the first light source module 201 and the second light source module 203 may be physically disposed in a reading pane 209 of the multiwavelength barcode reader 20, and are longitudinally arranged. FIG. 6 shows a second preferred embodiment of the present invention. Referring to FIG. 6, the first light source module 201 and the second light source module 203 are longitudinally arranged close to each other. FIG. 7 shows a third preferred embodiment of the present invention. Referring to FIG. 7, the first light source module 201 and the second light source module 203 are laterally arranged in an alternating manner. Moreover, the light source modules have different wavelengths, so as to generate light in different colors. For example, the first light source module 201 generates red light, and the second light source module 203 generates blue light. When the two light source modules operate at the same time, a light blending effect is obtained, and a light source of a third wavelength is generated. Thereby, even if a color image of the barcode is read, the multiwavelength barcode reader 20 also achieves a preferred read rate. Further, in the multiwavelength barcode reader of the present invention, a third light source module of another wavelength is disposed, for example, to generate green light. As such, the first light source module, the second light source module, and the third light source module may be LED chips having different wavelengths, for example, R, G, B chips, disposed on a circuit board. The LED chips are controlled by voltage or current to be turned on sequentially or simultaneously, thereby achieving the aforementioned efficacies of the present invention.

As described above, in the implementation of the multiwavelength barcode reader of the present invention, the color of the light emitted in reading is varied in accordance with different colors of a color image of the barcode, so that the resolution and practical applicability of the barcode reader are improved. Therefore, a barcode reader capable of scanning or reading barcodes of different colors is achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multiwavelength barcode reader, applied for reading an image of a barcode, comprising:
   a driving unit, serving as an on-chip microprocessor;
   a first light source module and a second light source module disposed close to each other in the multiwavelength barcode reader, electrically connected to the driving unit, and driven by the driving unit to emit light, the light generated by the first light source module and the light generated by the second light source module have different wavelengths;
   an image capturing module, electrically connected to the driving unit, and driven by the driving unit to perform image capturing;
   a switch, electrically connected to the driving unit, for actuating the driving unit to initially turn on the first light source module and capturing a first image in the image capturing unit;
   a detection unit, electrically connected between the image capturing module and the driving unit, for detecting a result of the image capturing of the image capturing module, if an image of the barcode is not successfully read, the driving unit turns on the second light source module and the detecting unit detects a result of the image capturing module of the second light source module;
   a translation module, electrically connected to the detection unit, for translating the result of the image capturing of the image capturing, module into data; and
   a transmission module, electrically connected to the translation module;
   wherein the driving unit first turns on the second light source module and turns off the first light source module if an image of the barcode is not successfully read by the detecting device with light from the first light source module and secondly turns on both the first light source module and the second light source module if an image of the barcode is not successfully read by the detecting, device with light from the second source module.

2. A method of reading a barcode using two different wavelengths of light, comprising:
   manually turning on a switch;
   the switch turning on a driving unit;
   the driving unit turning on a first light source module disposed in a barcode reader and emitting a first wavelength of light in a first direction;
   an image capturing module capturing the barcode image of the first wavelength;
   a detecting unit detecting a result of the image capturing module;
   if the image is not successfully read, the driving unit turns on a second light source disposed in the barcode reader emitting a second wavelength of light, which is different from the first wavelength of light, in the first direction and the detecting unit detects a result of the image capturing unit of the second wavelength;
   translating the result of the image capturing module into data; and
   transmitting the data;
   wherein if the image is not successfully read with light from the first light source module, the driving unit first turns on a second hart source module and turns off the first light source module and secondly turns on both the first light source module and the second light source module if an image of the barcode is not successfully read by the detecting device with light from the second light source module.

* * * * *